United States Patent
Akaba et al.

(10) Patent No.: US 11,046,332 B2
(45) Date of Patent: *Jun. 29, 2021

(54) VEHICLE CONTROL DEVICE, VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Shogo Akaba, Wako (JP); Kazuyuki Kaneko, Wako (JP); Genta Boda, Wako (JP); Masahiko Asakura, Wako (JP); Yoshitaka Mimura, Wako (JP); Naotaka Kumakiri, Wako (JP); Kohei Okimoto, Wako (JP); Hironori Takano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 16/344,822

(22) PCT Filed: Nov. 9, 2016

(86) PCT No.: PCT/JP2016/083199
§ 371 (c)(1),
(2) Date: Apr. 25, 2019

(87) PCT Pub. No.: WO2018/087828
PCT Pub. Date: May 17, 2018

(65) Prior Publication Data
US 2020/0047773 A1    Feb. 13, 2020

(51) Int. Cl.
*B60W 50/14*    (2020.01)
*B60W 10/04*    (2006.01)
(Continued)

(52) U.S. Cl.
CPC ............ *B60W 50/14* (2013.01); *B60W 10/04* (2013.01); *B60W 10/20* (2013.01); *B60W 30/18* (2013.01);
(Continued)

(58) Field of Classification Search
CPC ............... B60W 10/04; B60W 10/20; B60W 2050/0073; B60W 2050/146;
(Continued)

(56) References Cited

U.S. PATENT DOCUMENTS

| 10,604,155 B2 * | 3/2020 | Takahashi | ............ B60W 30/165 |
| 2009/0309970 A1 * | 12/2009 | Ishii | ................... B62D 15/027 348/143 |

(Continued)

FOREIGN PATENT DOCUMENTS

| CN | 101303572 | 11/2008 |
| CN | 101516684 | 8/2009 |

(Continued)

OTHER PUBLICATIONS

International Search Report and Written Opinion for International Application No. PCT/JP2016/083199 dated Feb. 7, 2017, 12 pgs.
(Continued)

*Primary Examiner* — Babar Sarwar
(74) *Attorney, Agent, or Firm* — Amin, Turocy & Watson, LLP

(57) ABSTRACT

When a second condition is satisfied in a case in which an automated driving control unit performs switching from automated driving to manual driving, a request for a remote operation is sent to an outside-vehicle facility using a communicator, and remote driving for automatically controlling at least one of acceleration/deceleration and steering of a vehicle is executed on the basis of control information received from the outside-vehicle facility.

14 Claims, 15 Drawing Sheets

(51) Int. Cl.
  *B60W 10/20* (2006.01)
  *B60W 30/18* (2012.01)
  *B60W 40/08* (2012.01)
  *G05D 1/00* (2006.01)
  *B60W 50/00* (2006.01)

(52) U.S. Cl.
  CPC ......... *B60W 40/08* (2013.01); *G05D 1/0088* (2013.01); *B60W 2050/0073* (2013.01); *B60W 2050/146* (2013.01); *B60W 2420/42* (2013.01); *B60W 2710/20* (2013.01); *B60W 2720/106* (2013.01); *G05D 2201/0213* (2013.01)

(58) Field of Classification Search
  CPC ......... B60W 2420/42; B60W 2540/26; B60W 2556/45; B60W 2710/20; B60W 2720/106; B60W 30/18; B60W 40/08; B60W 50/14; B60W 60/0053; G05D 1/0027; G05D 1/0038; G05D 1/0088; G05D 2201/0213; G08G 1/09; G08G 1/16
  See application file for complete search history.

(56) References Cited

U.S. PATENT DOCUMENTS

| | | | |
|---|---|---|---|
| 2012/0126065 A1 | 5/2012 | Smith et al. | |
| 2013/0046421 A1* | 2/2013 | El Fassi | H04L 67/125 701/2 |
| 2014/0303827 A1* | 10/2014 | Dolgov | B60W 30/00 701/23 |
| 2015/0153733 A1* | 6/2015 | Ohmura | G05D 1/0061 701/23 |
| 2016/0139594 A1 | 5/2016 | Okumura et al. | |
| 2016/0207538 A1 | 7/2016 | Urano et al. | |
| 2016/0264021 A1* | 9/2016 | Gillett | B60K 37/06 |
| 2016/0280236 A1* | 9/2016 | Otsuka | B60W 50/082 |
| 2016/0340867 A1* | 11/2016 | Matsuzaki | A01B 69/008 |
| 2017/0147004 A1* | 5/2017 | Reichel | B60W 40/08 |
| 2017/0259820 A1* | 9/2017 | Takahashi | G08G 1/22 |
| 2019/0265710 A1* | 8/2019 | Kaneko | B60W 40/08 |
| 2019/0324453 A1* | 10/2019 | Mori | G05D 1/0223 |
| 2019/0339696 A1 | 11/2019 | Mori | |
| 2020/0047773 A1* | 2/2020 | Akaba | B60W 10/20 |

FOREIGN PATENT DOCUMENTS

| | | | |
|---|---|---|---|
| CN | 101823435 | 9/2010 | |
| CN | 102069763 | 5/2011 | |
| CN | 102862568 | 1/2013 | |
| EP | 1967931 A2 * | 9/2008 | ......... G05D 1/0061 |
| JP | 2004-295360 | 10/2004 | |
| JP | 2004-295521 | 10/2004 | |
| JP | 2005-011284 | 1/2005 | |
| JP | 2014-106854 | 6/2014 | |
| JP | 2015-182525 | 10/2015 | |
| JP | 2016-018238 | 2/2016 | |
| JP | 2016-074317 | 5/2016 | |
| JP | 2016-095851 | 5/2016 | |
| JP | 2016-132352 | 7/2016 | |
| JP | 2016-151815 | 8/2016 | |
| WO | 2016/038931 | 3/2016 | |

OTHER PUBLICATIONS

International Search Report and Written Opinion for International Application No. PCT/JP2016/083508 dated Dec. 13, 2016, 9 pgs.
Chinese Office Action and Search Report for Chinese Patent Application No. 201680090384.8 dated Jan. 4, 2021.
United States Office Action for U.S. Appl. No. 16/346,130 dated Apr. 15, 2021.

* cited by examiner

| VEHICLE TYPE | COMPANY A○○ |
|---|---|
| ACCELERATOR OPERATION AMOUNT MAGNIFICATION | 1.10 TIMES |
| BRAKE DEPRESSION AMOUNT MAGNIFICATION | 1.10 TIMES |
| STEERING TORQUE MAGNIFICATION | 10.95 TIMES |
| STEERING RATIO MULTIPLIER | 1.05 TIMES |

FOR EACH VEHICLE TYPE

FIG. 14

| VEHICLE ID | COMMUNICATION ID | LINK ID | PROGRESSION DIRECTION | REASON | REASON RANK |
|---|---|---|---|---|---|
| 001 | ... | ... | ... | ACCIDENT AT JUNCTION IN FRONT | A |
| 002 | ... | ... | ... | TOLLGATE IN FRONT | C |
| ... | ... | ... | ... | ... | ... |

| REMOTE OPERATING PERSON ID | EXPERIENCE | EVALUATION | COMPREHENSIVE SKILL | EXECUTION OF REMOTE OPERATION |
|---|---|---|---|---|
| 001 | 5 YEARS | NORMAL | B | YES |
| 002 | 12 YEARS | GOOD | A | NO |
| ... | ... | ... | ... | ... |

VEHICLE CONTROL DEVICE, VEHICLE CONTROL SYSTEM, VEHICLE CONTROL METHOD, AND STORAGE MEDIUM

TECHNICAL FIELD

The present invention relates to a vehicle control device, a vehicle control system, a vehicle control method, and a storage medium.

BACKGROUND ART

In recent years, research on automated driving for automatically performing acceleration/deceleration or steering has been proceeding. In relation thereto, a technology for performing a notification for requesting a driver to release automated driving when a determination means determines that a condition for performing automated driving is not satisfied during automated driving has been disclosed (see Patent Literature 1). Further, a technology in which a vehicle communicates with an external device to execute heteronomous-oriented autonomous driving through a remote operation when it is determined that the vehicle cannot execute autonomous-oriented automated driving has been disclosed (see Patent Literature 2).

CITATION LIST

Patent Literature

Patent Literature 1
  Japanese Unexamined Patent Application, First Publication No. 2014-106854
Patent Literature 2
  International Patent Publication No. 2016/038931

SUMMARY OF INVENTION

Technical Problem

However, in the prior art, when manual driving can be performed by a vehicle occupant, it is not necessary to shift to remote driving in some cases.

The present invention has been made in consideration of such circumstances, and an object of the present invention is to provide a vehicle control device, a vehicle control system, a vehicle control method, and a vehicle control program in which remote driving is able to be performed only in necessary scenes.

Solution to Problem (1): A vehicle control device including: acquisitor that acquires a situation outside a vehicle; a driving operator on which an operation for manual driving is performed by a vehicle occupant; an automated driving control unit that executes automated driving for automatically controlling at least one of acceleration/deceleration and steering of the vehicle on the basis of the situation outside the vehicle acquired by the acquisitor, and ends the automated driving and performs switching to manual driving when a first condition is satisfied; a communicator that communicates with an outside-vehicle facility; a remote driving controller that sends a request for a remote operation to the outside-vehicle facility using the communicator when a second condition is satisfied in a case in which the automated driving control unit performs switching from the automated driving to the manual driving, and executes remote driving for automatically controlling at least one of acceleration/deceleration and steering of the vehicle on the basis of control information received from the outside-vehicle facility.

(2): The vehicle control device according to (1), further includes a detector that detects a state of the vehicle occupant, wherein the second condition includes that the state of the vehicle occupant detected by the detector is not suitable for performing the manual driving.

(3): The vehicle control device according to (1), further includes an output unit that outputs information, wherein the automated driving control unit causes the output unit to output information for requesting an operation of the driving operator when ending the automated driving and performing switching to manual driving, and ends the automated driving and performs the switching to manual driving when the operation of a predetermined amount or more on the driving operator is performed, and the second condition includes that the vehicle occupant does not operate the driving operator by a predetermined amount or more after the automated driving control unit notifies the vehicle occupant of the switching to manual driving.

(4): The vehicle control device according to (1), further includes an input unit that receives an input operation of the vehicle occupant, wherein the second condition includes that a predetermined operation has been performed on the input unit.

(5): The vehicle control device according to (1), wherein the acquisitor includes a camera that images the vicinity of the vehicle, and the remote driving controller transmits an image captured by the camera to the outside-vehicle facility using the communicator.

(6): The vehicle control device according to (1), wherein the first condition is that execution of the automated driving has become difficult, and the remote driving controller transmits information based on a type or degree of cause of difficulty in executing the automated driving to the outside-vehicle facility using the communicator.

(7): The vehicle control device according to (1), wherein the automated driving control unit is capable of executing following traveling in which the vehicle travels while following another vehicle during execution of the automated driving, and switching between whether the automated driving control unit executes following traveling and the remote driving controller executes the remote driving is performed on the basis of a situation in which the first condition is satisfied.

(8): The vehicle control device according to (1), further includes a display unit (SN, TL, HL) that displays information inside or outside the vehicle, wherein the remote driving controller causes the display unit to display information indicating that the remote driving is being executed when the remote driving is executed.

(9): The vehicle control device according to (1), and further includes an input unit that receives an input operation of the vehicle occupant, wherein the remote driving controller starts the remote driving when an input operation indicating permission of the remote driving performed on the input unit is performed in advance.

(10): The vehicle control device according to (1), further includes an input unit that receives an input operation of the vehicle occupant, wherein the remote driving controller transmits evaluation results of the remote operation input to the input unit to the outside-vehicle facility after performing the remote driving.

(11): A vehicle control system including: the vehicle control device according to (1); and the outside-vehicle facility.

(12): The vehicle control system-according to (11), wherein the first condition is that execution of the automated driving has become difficult, and the remote driving controller transmits information based on a type or degree of cause of difficulty in executing the automated driving to the outside-vehicle facility using the communicator, and the outside-vehicle facility includes a plurality of remote operation devices that are each operated by a remote operating person; and a general control device that selects a remote operating person who is to perform remote operation on the basis of information received from the remote driving controller.

(13): The vehicle control system according to (11), wherein the outside-vehicle facility includes conversion information for defining an amount of conversion when generating the control information with respect to an amount of operation of a remote operating person for each vehicle type, and converts the amount of operation of the remote operating person with the conversion information to generate the control information.

(14): A vehicle control method using a computer including: acquiring a situation outside a vehicle; executing automated driving for automatically controlling at least one of acceleration/deceleration and steering of the vehicle on the basis of the acquired situation outside the vehicle, and ending the automated driving and performing switching to manual driving when a first condition is satisfied; communicating with an outside-vehicle facility; sending a request for a remote operation to the outside-vehicle facility using the communicator when a second condition is satisfied in a case in which switching from the automated driving to the manual driving is performed, and executing remote driving for automatically controlling at least one of acceleration/deceleration and steering of the vehicle on the basis of control information received from the outside-vehicle facility.

(15): A computer-readable non-transitory storage medium storing a vehicle control program causing a computer to: acquire a situation outside a vehicle; execute automated driving for automatically controlling at least one of acceleration/deceleration and steering of the vehicle on the basis of the acquired situation outside the vehicle, and end the automated driving and perform switching to manual driving when a first condition is satisfied; communicate with an outside-vehicle facility; and send a request for a remote operation to the outside-vehicle facility using the communicator when a second condition is satisfied in a case in which switching from the automated driving to the manual driving is performed, and execute remote driving for automatically controlling at least one of acceleration/deceleration and steering of the vehicle on the basis of control information received from the outside-vehicle facility.

Advantageous Effects of Invention

According to (1), (5), (9) to (11), (14), and (15), it is possible to perform the remote driving only in necessary scenes.

According to (2) and (3), it is also possible to perform compensation through remote driving when the vehicle occupant is highly likely to be unable to perform shift to manual driving.

According to (4), it is possible to start the remote driving according to an intention of the vehicle occupant.

According to (6) and (12), it is also possible to perform remote operation according to a scene under which the vehicle is placed.

According to (7), it is also possible to reduce a load of control or communication by temporarily performing following traveling in a scene in which the remote driving is unnecessary.

According to (8), it is also possible to cause a driver or a person outside the vehicle to rapidly ascertain a situation under which the vehicle is placed.

BRIEF DESCRIPTION OF DRAWINGS

FIG. 14 illustrates an example of information that is transmitted from the vehicle M to the remote operation management facility.

FIG. 15 is a diagram illustrating an example of content of a remote operating person list.

DESCRIPTION OF EMBODIMENTS

Hereinafter, embodiments of a vehicle control device, a vehicle control system, a vehicle control method, and a storage medium according to the present invention will be described with reference to the drawings.

First Embodiment

[System Configuration]

Figure 1:
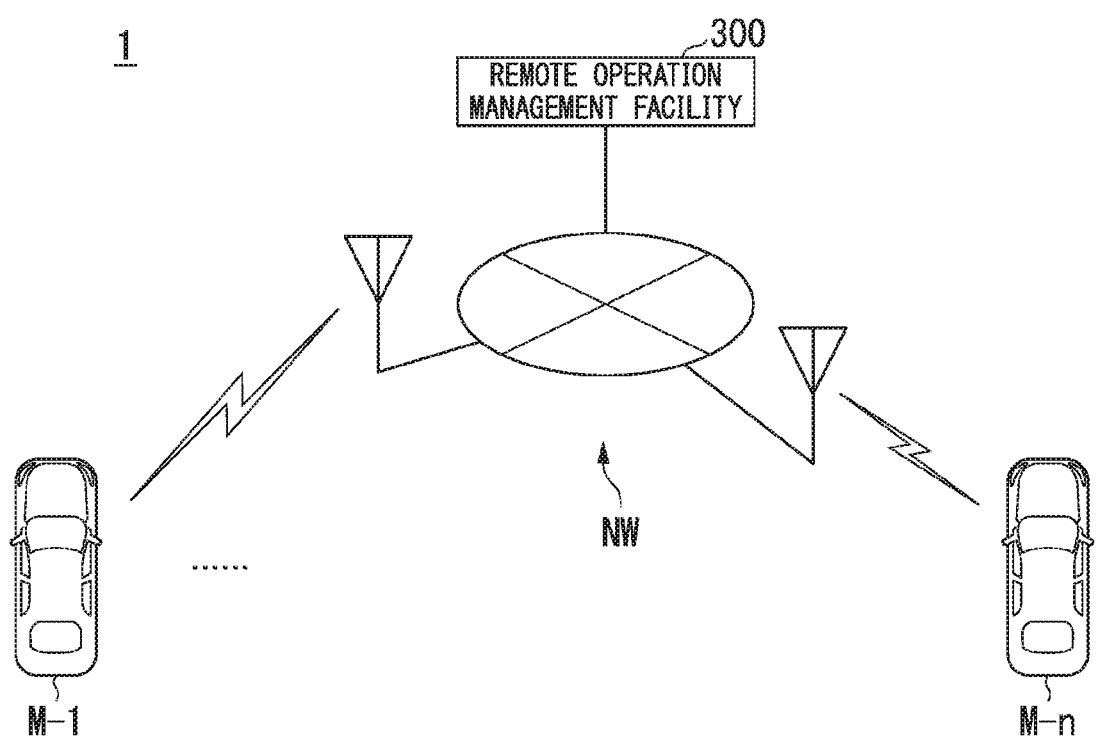
FIG. 1 is a conceptual diagram of a vehicle control system.

FIG. 1 is a conceptual diagram of a vehicle control system 1. The vehicle control system 1 is realized through communication between a plurality of vehicles M-1 to Mn (n is an arbitrary natural number) and a remote operation management facility 300 via a network NW. Hereinafter, when the vehicles are not distinguished from each other, the vehicles are referred to as vehicles M. The vehicle M is, for example, a vehicle such as a two-wheeled vehicle, a three-wheeled vehicle, or a four-wheeled vehicle. A driving source thereof is an internal combustion engine such as a diesel engine or a gasoline engine, an electric motor, or a combination thereof. The electric motor operates using power generated by a power generator connected to the internal combustion engine or discharge power of a secondary battery or a fuel cell. Further, the vehicle M is a vehicle capable of executing automated driving in which at least one of acceleration/deceleration and steering is automatically controlled. The network NW includes a base station that is an interface for wireless communication, a wide area network (WAN), a local area network (LAN), the Internet, a dedicated line, and the like.

In the vehicle control system 1, a request for a remote operation is transmitted from the vehicle M to a remote driving management facility 300 or from a certain vehicle M to another vehicle M, and the remote operation of the vehicle M is executed in response to the request.

[Vehicle Configuration]

Figure 2:
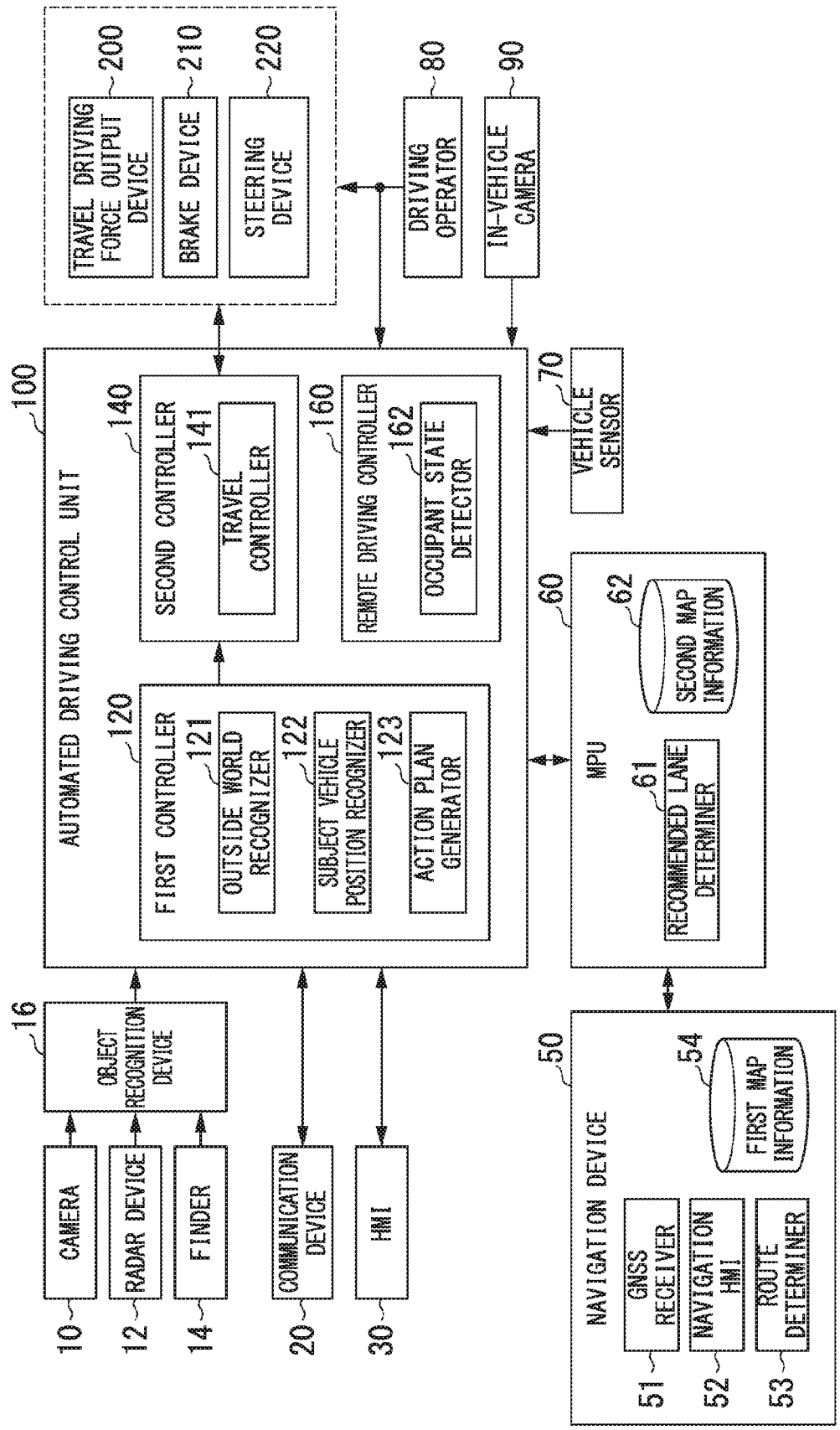
FIG. 2 is a diagram illustrating an example of a configuration mounted in a vehicle M.

First, a configuration mounted in the vehicle M will be described. FIG. 2 is a diagram illustrating an example of the configuration mounted in the vehicle M. In the vehicle M, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an in-vehicle camera 90, an automated driving control unit 100, a travel driving force output device 200, a brake device 210, and a steering device 220. These units or devices are connected to each other by a multiplex communication line such as a controller area network (CAN) communication line, a serial communication line, a wireless communication network, or the like. It should be noted that the configuration illustrated in FIG. 2 is merely an example, and a part of the configuration may be omitted or another configuration may be added. Among the configurations illustrated in FIG. 2, a device that at least includes the camera 10, the communication device 20, the driving operator 80, the first controller 120, the second controller 140, and a remote driving controller 160 is an example of a "vehicle control device".

The camera 10 is, for example, a digital camera using a solid-state imaging device such as a charge coupled device (CCD) or a complementary metal oxide semiconductor (CMOS). One or a plurality of cameras 10 are attached to arbitrary places of the vehicle M. In a case in which a front side is imaged, the camera 10 is attached to an upper portion of a front windshield, a rear surface of a rearview mirror, or the like. The camera 10, for example, periodically repeatedly images the vicinity of the vehicle M. The camera 10 may be a stereo camera.

The radar device 12 radiates radio waves such as millimeter waves to the vicinity of the vehicle M and detects radio waves reflected by the object (reflected waves) to detect at least a position (a distance and a direction) of the object. One or a plurality of radar devices 12 are attached to arbitrary places of the vehicle M. The radar device 12 may detect a position and a speed of the object using a frequency modulated continuous wave (FM-CW) scheme.

The finder 14 is a light detection and ranging or laser imaging detection and ranging (LIDAR) which measures scattered light with respect to irradiation light and detects a distance to the object. One or a plurality of finders 14 are attached to arbitrary places of the vehicle M.

The object recognition device 16 performs a sensor fusion process on detection results of some or all of the camera 10, the radar device 12, and the finder 14 to recognize a position, a type, a speed, and the like of the object. The object recognition device 16 outputs a recognition result to the automated driving control unit 100.

The communication device 20 communicates with other vehicles near the vehicle M, for example, using a cellular network, a Wi-Fi network, Bluetooth (registered trademark), dedicated short range communication (DSRC), or the like, or communicates with various server devices via a wireless base station.

The HMI 30 presents various types of information to an occupant of the vehicle M and receives an input operation from the occupant. Examples of the HMI 30 include various display devices, speakers, buzzers, touch panels, various operating switches, or keys.

The navigation device 50 includes, for example, a global navigation satellite system (GNSS) receiver 51, a navigation HMI 52, and a route determiner 53, and holds first map information 54 in a storage device such as a hard disk drive (HDD) or a flash memory. The GNSS receiver specifies the position of the vehicle M on the basis of a signal received from a GNSS satellite. The position of the vehicle M may be specified or supplemented by an inertial navigation system (INS) using an output of the vehicle sensor 70. The navigation HMI 52 includes a display device, a speaker, a touch panel, keys, or the like. The navigation HMI 52 may be partly or wholly shared with the above-described HMI 30. The route determiner 53, for example, may determine a route to the destination input by the occupant using the navigation HMI 52 from the position of the vehicle M specified by the GNSS receiver 51 (or an arbitrary input position), by referring to the first map information 54. The first map information 54 is, for example, information in which a road shape is expressed by a link indicating a road and nodes connected by a link. The first map information 54 may include a curvature of the road, point of interest (POI) information, or the like. The route determined by the route determiner 53 is output to the MPU 60. Further, the navigation device 50 may perform route guidance using the navigation HMI 52 on the basis of the route determined by the route determiner 53. It should be noted that the navigation device 50 may be realized using a function of a terminal device such as a smartphone or a tablet terminal held by the user, for example. Further, the navigation device 50 may transmit a current position and the destination to the navigation server via the communication device 20, and acquire a route returning from the navigation server.

The MPU 60 functions as, for example, a recommended lane determiner 61 and holds second map information 62 in a storage device such as an HDD or a flash memory. The recommended lane determiner 61 divides the route provided from the navigation device 50 into a plurality of blocks (for example, divides the route every 100 [m] in a progression direction of the vehicle) and determines a recommended lane for each block by referring to the second map information 62. The recommended lane determiner 61 determines in which lane from the left the vehicle M travels. The recommended lane determiner 61 determines the recommended lane so that the vehicle M can travel on a reasonable route for progression to a branch destination when there is a branching place or a merging place in the route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The road information includes information indicating types of roads such as expressways, toll roads, national highways, and prefectural roads, or information such as the number of lanes on a road, a width of each lane, a gradient of the road, a position of the road (three-dimensional coordinates including a longitude, a latitude, and a height), a curvature of a curve of the lane, a position of a merging or branching point of a lane, and signs provided on a road. The second map information 62 may be updated at any time through access to another device using the communication device 20.

The vehicle sensor 70 includes, for example, a vehicle speed sensor that detects a speed of the vehicle M, an acceleration sensor that detects an acceleration, a yaw rate sensor that detects an angular velocity around a vertical axis, and an orientation sensor that detects a direction of the vehicle M.

The driving operator 80 includes, for example, an accelerator pedal, a brake pedal, a shift lever, a steering wheel, and other operators. A sensor that detects the amount of an operation or the presence or absence of an operation is attached to the driving operator 80, and a result of the detection is output to one or both of the automated driving control unit 100, and the travel driving force output device 200, the brake device 210, and the steering device 220.

The in-vehicle camera 90 images an upper body around a face of an occupant seated in a driver's seat. A captured image of the in-vehicle camera 90 is output to the automated driving control unit 100.

The automated driving control unit 100 includes, for example, the first controller 120, the second controller 140, and the remote driving controller 160. Each of the first controller 120, the second controller 140, and the remote driving controller 160 is realized by a processor such as a central processing unit (CPU) executing a program (software). In addition, some or all of functional units of the first controller 120, the second controller 140, and the remote driving controller 160 to be described below may be realized by hardware such as a large scale integration (LSI), an application specific integrated circuit (ASIC), or a field-programmable gate array (FPGA) or may be realized by software and hardware in cooperation.

The first controller 120 includes, for example, an outside world recognizer 121, a subject vehicle position recognizer 122, and an action plan generator 123.

The outside world recognizer 121 recognizes a state such as a position, a speed, and an acceleration of a nearby vehicle on the basis of information input from the camera 10, the radar device 12, and the finder 14 directly or via the object recognition device 16. The position of the nearby vehicle may be represented by a representative point such as a centroid or a corner of the nearby vehicle or may be represented by an area represented by a contour of the nearby vehicle. The "state" of the nearby vehicle may include an acceleration or jerk of the nearby vehicle, or an "action state" (for example, whether the nearby vehicle is changing a lane or is about to change a lane). Further, the outside world recognizer 121 may also recognize a position of a guardrail, a utility pole, a parked vehicle, a pedestrian, and other objects, in addition to the nearby vehicle.

The subject vehicle position recognizer 122 recognizes, for example, a lane in which the vehicle M is traveling (a travel lane) and a relative position and posture of the vehicle M with respect to the travel lane. The subject vehicle position recognizer 122, for example, compares a pattern of a road marking line (for example, an arrangement of a solid line and a broken line) obtained from the second map information 62 with a pattern of a road marking line near the vehicle M recognized from an image captured by the camera 10 to recognize the travel lane. In this recognition, the position of the vehicle M acquired from the navigation device 50 or a processing result of the INS may be additionally considered.

Figure 3:
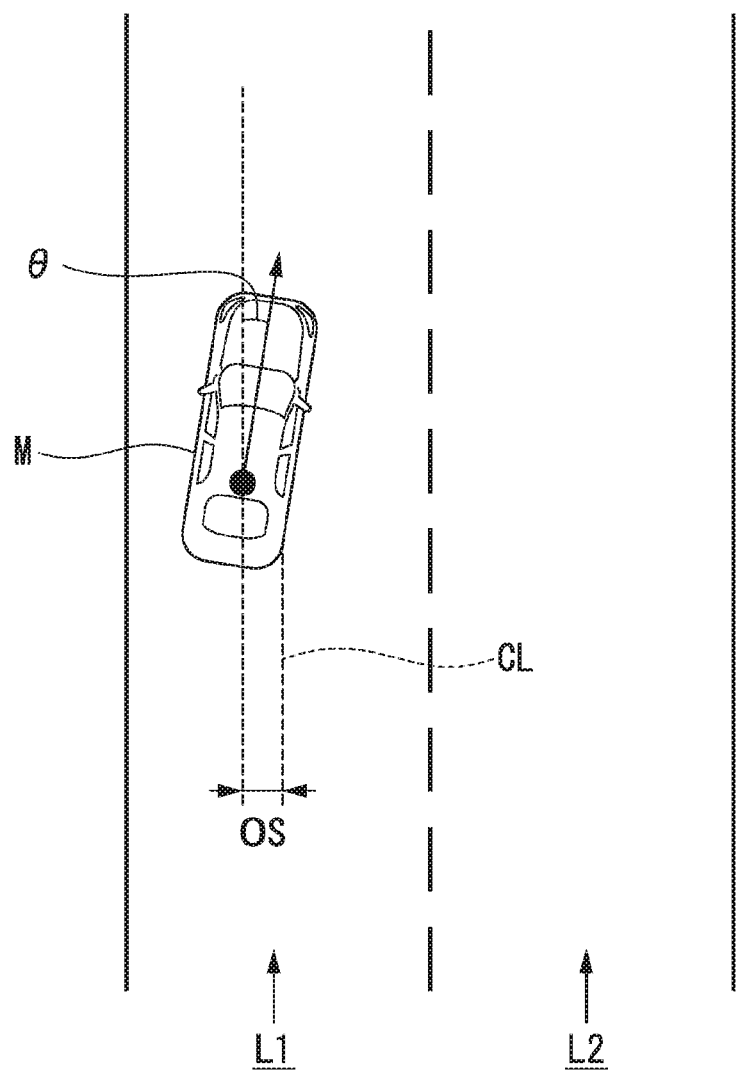
FIG. 3 is a diagram illustrating a state in which a relative position and posture of the vehicle M with respect to a travel lane L1 are recognized by a subject vehicle position recognizer.

The subject vehicle position recognizer 122 recognizes, for example, a position or a posture of the vehicle M relative to the travel lane. FIG. 3 is a diagram illustrating a state in which a relative position and posture of the vehicle M relative to a travel lane L1 are recognized by the subject vehicle position recognizer 122. The subject vehicle position recognizer 122, for example, recognizes a deviation OS of a reference point (for example, a centroid) of the vehicle M from a travel lane center CL and an angle θ of a progression direction of the vehicle M with respect to a line connecting the travel lane center CL as the relative position and posture of the vehicle M relative to the travel lane L1. It should be noted that, alternatively, the subject vehicle position recognizer 122 may recognize, for example, a position of the reference point of the vehicle M relative to any one of side end portions of the subject travel lane L1 as a relative position of the vehicle M relative to the travel lane. The relative position of the vehicle M recognized by the subject vehicle position recognizer 122 is provided to the recommended lane determiner 61 and the action plan generator 123.

The action plan generator 123 determines events to be sequentially executed in the automated driving so that the vehicle M travels along the recommended lane determined by the recommended lane determiner 61 and so that the vehicle M can cope with surrounding situations of the vehicle M. The events include, for example, a constant-speed traveling event in which a vehicle travels on the same travel lane at a constant speed, a following traveling event in which a vehicle follows a preceding vehicle, a lane changing event, a merging event, a branching event, an emergency stopping event, and a handover event in which automated driving is ended and switching to manual driving is performed. Further, an action for avoidance may be planned on the basis of the surrounding situation of the vehicle M (presence of nearby vehicles or pedestrians, lane narrowing due to road construction, or the like) during execution of these events.

The action plan generator 123 generates a target trajectory in which the vehicle M will travel in the future. The target trajectory includes, for example, a speed element. For example, a plurality of future reference times may be set for each predetermined sampling time (for example, every several tenths of a [sec]), and the target trajectory may be generated as a set of target points (trajectory points) that a vehicle is to reach at respective reference times. Therefore, when an interval between the trajectory points is great, the vehicle travels at a high speed in a section between the trajectory points.

Figure 4:
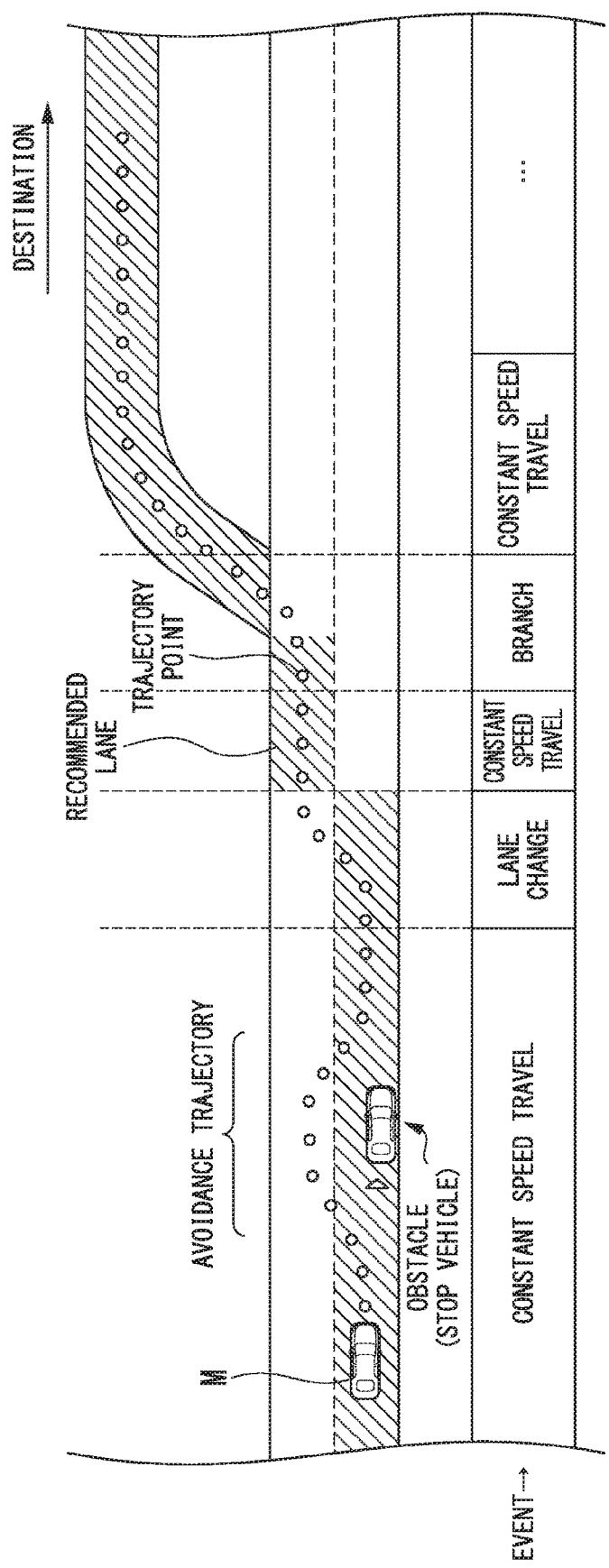
FIG. 4 is a diagram illustrating a state in which a target trajectory is generated on the basis of a recommended lane.

FIG. 4 is a diagram illustrating a state in which the target trajectory is generated on the basis of the recommended lane. As illustrated in FIG. 4, the recommended lane is set so that a vehicle conveniently travels along a route to a destination. The action plan generator 123 activates the lane change event, the branching event, the merging event, or the like when a vehicle approach a predetermined distance ahead (which may be determined according to a type of event) at a point at which the recommended lane is switched. When it is necessary to avoid an obstacle during the execution of each event, an avoidance trajectory is generated as illustrated in FIG. 4.

The action plan generator 123 generates, for example, a plurality of target trajectory candidates, and selects an optimal target trajectory at that time on the basis of the viewpoint of safety and efficiency.

The second controller 140 includes a travel controller 141. The travel controller 141 controls the travel driving force output device 200, the brake device 210, and the steering device 220 so that the vehicle M passes through the target trajectory generated by the action plan generator 123 according to a scheduled time.

A function of the remote driving controller 160 will be described below.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an ECU that controls these. The ECU controls the above configuration according to information input from the automated driving control unit 100 or information input from the driving operator 80.

The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to the information input from the automated driving control unit 100 or the information input from the driving operator 80 so that a brake torque according to a braking operation is output to each wheel. The brake device 210 may include, as a backup, a mechanism that transfers the hydraulic pressure generated by the operation of the brake pedal included in the driving operator 80 to the cylinder via a master cylinder. It should be noted that the brake device 210 is not limited to the configuration described above and may be an electronically controlled hydraulic brake device that controls an actuator according to information input from the travel controller 141 and transfers the hydraulic pressure of the master cylinder to the cylinder.

The steering device 220 includes, for example, a steering ECU and an electric motor. The electric motor, for example, changes a direction of steerable wheels by causing a force to act on a rack and pinion mechanism. The steering ECU drives the electric motor according to the information input from the automated driving control unit 100 or the information input from the driving operator 80 to change the direction of the steerable wheels.

[End of Automated Driving]

A handover event for ending automated driving and performing switching to manual driving will be described herein. The action plan generator 123 activates the handover event when the first condition has been satisfied. The first condition is a condition obtained by OR-connecting a plurality of conditions. For example, when any one of conditions to be illustrated below is satisfied, it may be determined that the first condition has been satisfied.

(1) The vehicle M has reached the vicinity of a preset destination.

(2) A surrounding environment of the vehicle M is an environment in which it would be difficult to continue automated driving.

(3) An operation of a predetermined amount or more has been performed on the driving operator 80 (overriding).

When the handover event is activated, the action plan generator 123 first causes the HMI 30 to output information (a handover request) for requesting an operation of the driving operator 80, and ends the automated driving and performs switching to manual driving when an operation of a predetermined amount or more has been performed on the driving operator 80. However, in the case of the overriding in (3) described above, the output of the information for requesting an operation of the driving operator 80 by the HMI 30 may be omitted, and the action plan generator 123 may instead cause the HMI 30 to output information indicating that switching to manual driving is to be performed. The operation of a predetermined amount or more is, for example, an operation such that a state in which an accelerator operation amount is equal to or more than a threshold value has continued for a predetermined time or more in the case of an accelerator pedal. The action plan generator 123, for example, gradually decreases a control gain related to the automated driving, and finally performs control so that the amount of operation of the driving operator 80 is directly provided to the travel driving force output device 200, the brake device 210, and the steering device 220. Thereafter, the automated driving control unit 100 does not participate in the control (may perform relay of signals), and manual driving in which the travel driving force output device 200, the brake device 210, and the steering device 220 are operated on the basis of the amount of operation of the driving operator 80 is executed.

[Remote Driving Control]

Hereinafter, remote driving control according to the embodiment will be described. When the handover event is activated and the second condition is satisfied, the remote driving controller 160 performs remote driving in which the remote driving controller 160 requests an outside-vehicle facility (which refers to a remote operation management facility 300 or another vehicle) to perform remote operation, using the communication device 20, and automatically controls at least one of acceleration/deceleration and steering of the vehicle M on the basis of control information received from outside-vehicle facility. The remote driving controller 160 includes, for example, an occupant state detector 162.

The second condition is, for example, a condition to be illustrated below. The remote driving controller 160 may determine that the second condition is satisfied when at least one of the following (A) and (B) is satisfied, or may determine that the second condition is satisfied when both of (A) and (B) are satisfied.

(A) An occupant (the driver) seated on the driver's seat, detected by the occupant state detector 162, is in a state in which it would not be suitable for the occupant to perform manual driving.

(B) A predetermined time has elapsed since the handover request, but an operation of a predetermined amount or more (which may be different from or the same as a reference of overriding) in response to the handover request has not been performed.

A state of the driver is ascertained by analyzing the image captured by the in-vehicle camera 90, for example. The occupant state detector 162, for example, determines that the driver is not suitable for manual driving in a state in which the eyes of the driver are closed (a sleep state), a state in which a direction of a line of sight ascertained from a relative position of the eye iris or the entire eye continues to be directed to a place other than a place in front of the vehicle M (a continuous looking-aside state), or any other state. It should be noted that a determination scheme for ascertaining the state of the driver may be arbitrarily determined, and the occupant state detector 162 may measure a heartbeat using, for example, an electrode attached to the steering wheel to ascertain the state of the driver, or may ascertain the state of the driver using a near infrared spectroscopy (NIRS) sensor or a seating weight sensor.

When the second condition is satisfied, the remote driving controller 160 transmits at least an image captured by the camera 10 and, preferably, a recognition result of the object recognition device 16 to the outside-vehicle facility using the communication device 20, and controls the travel driving force output device 200, the brake device 210, and the steering device 220 on the basis of replied control information.

Figure 5:
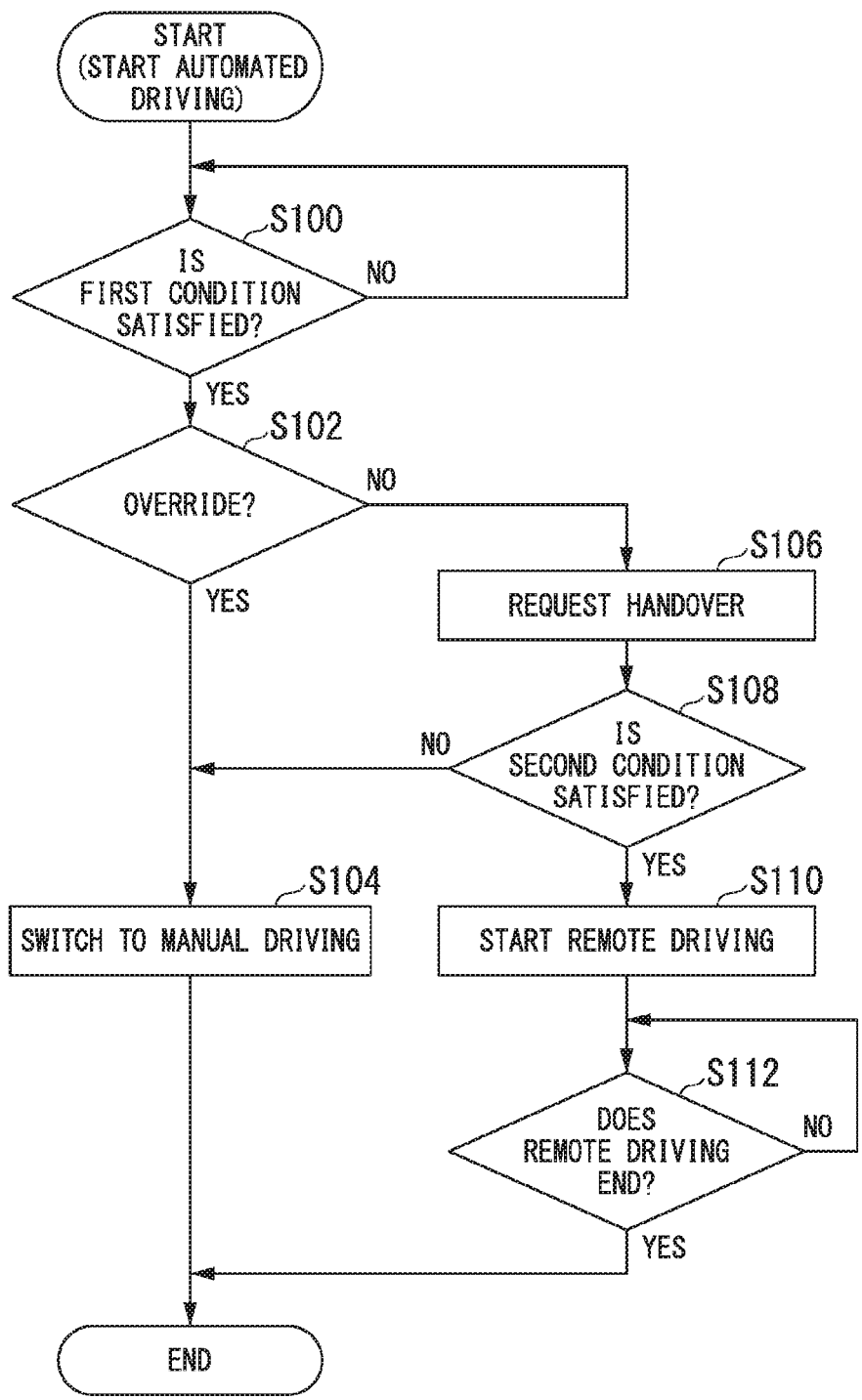
FIG. 5 is a flowchart partially illustrating a process that is executed by an automated driving control unit.

FIG. 5 is a flowchart partially illustrating a process that is executed by the automated driving control unit 100. The process of this flowchart is started when the automated driving is started.

First, the action plan generator 123 stands by until the first condition is satisfied (step S100). When the first condition is satisfied, the action plan generator 123 determines whether or not the first condition has been satisfied by overriding (step S102). When the first condition has been satisfied by overriding, the action plan generator 123 performs switching to manual driving (step S104).

When the first condition has not been satisfied by overriding, the action plan generator 123 causes the HMI 30 to output a handover request (step S106).

Next, the remote driving controller 160 determines whether or not the second condition is satisfied (step S108). When the second condition is not satisfied, the remote driving controller 160 notifies the action plan generator 123 of the fact, and the action plan generator 123 performs switching to manual driving (step S104).

When the second condition is satisfied, the remote driving controller 160 starts remote driving (step S110), and continues the remote driving until this remote driving ends (step S112). The remote driving is ended by a remote operating person, for example, when the vehicle M is moved to a safe position by the remote operating person.

Figure 6:
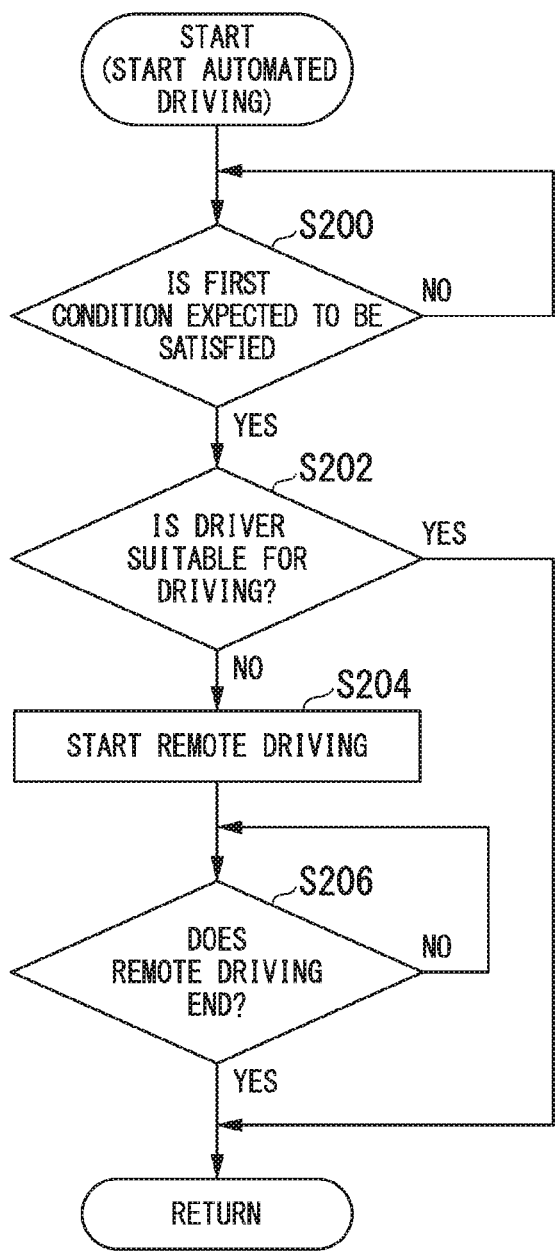
FIG. 6 is a flowchart illustrating another example of the process that is executed by the automated driving control unit.

It should be noted that the remote driving controller 160 may start the remote driving even before the first condition is satisfied. FIG. 6 is a flowchart illustrating another example of the process that is executed by the automated driving control unit 100. The process of this flowchart may be executed in parallel with the flowchart illustrated in FIG. 5 or may be executed alone.

First, the action plan generator 123 determines whether or not the first condition is predicted to be satisfied (step S200). For example, when a predetermined distance or less or a predetermined time or less remains to a preset destination or when there is a place that is under an environment in which it would be difficult to continue automated driving to a progression destination of the vehicle M due to communication or the like, the action plan generator 123 predicts that the first condition is satisfied.

When the action plan generator 123 predicts that the first condition is satisfied, the remote driving controller 160 determines whether or not the driver is in a state in which it would be suitable for the driver to perform driving (step S202). When the driver is in a state in which the driver is suitable for driving, one routine of this flowchart ends. A determination scheme of this step is as described above.

When the driver is not in a state in which the driver is suitable for driving, the remote driving controller 160 starts the remote driving (step S204) and continues the remote driving until this remote driving is ended (step S206).

Through such control, it is possible to rapidly start the remote driving when the driver is not in a state in which the driver is suitable for driving in a scene in which the automated driving will be ended in the near future.

Figure 7:
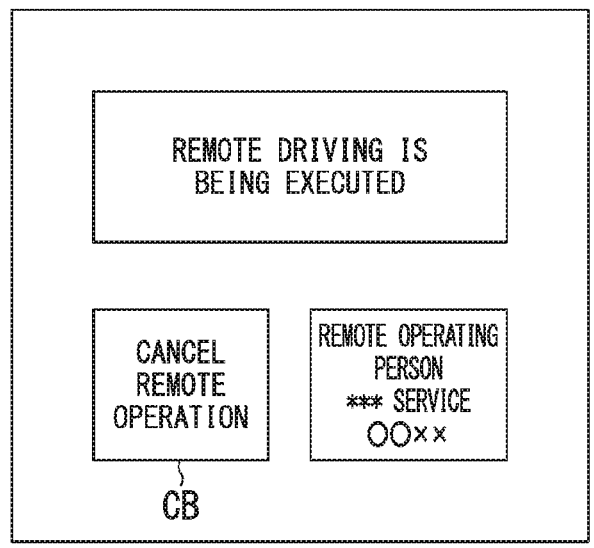
FIG. 7 is a diagram illustrating an example of a screen that is displayed while remote driving is being executed.

The remote driving controller 160 may cause a display device of the HMI 30 to display information indicating that the remote driving controller 160 is performing the remote driving while the remote driving controller 160 is performing the remote driving. FIG. 7 is a diagram illustrating an example of a screen that is displayed while the remote driving is being executed. For example, when the display device is a touch panel, a cancel button CB for canceling remote operation may be provided and, for example, information on a remote operation provider or a remote operating person may also be included on the screen. Accordingly, the driver can quickly ascertain the situation of the vehicle M, for example, immediately after the driver wakes up from a sleep state.

Figure 8:
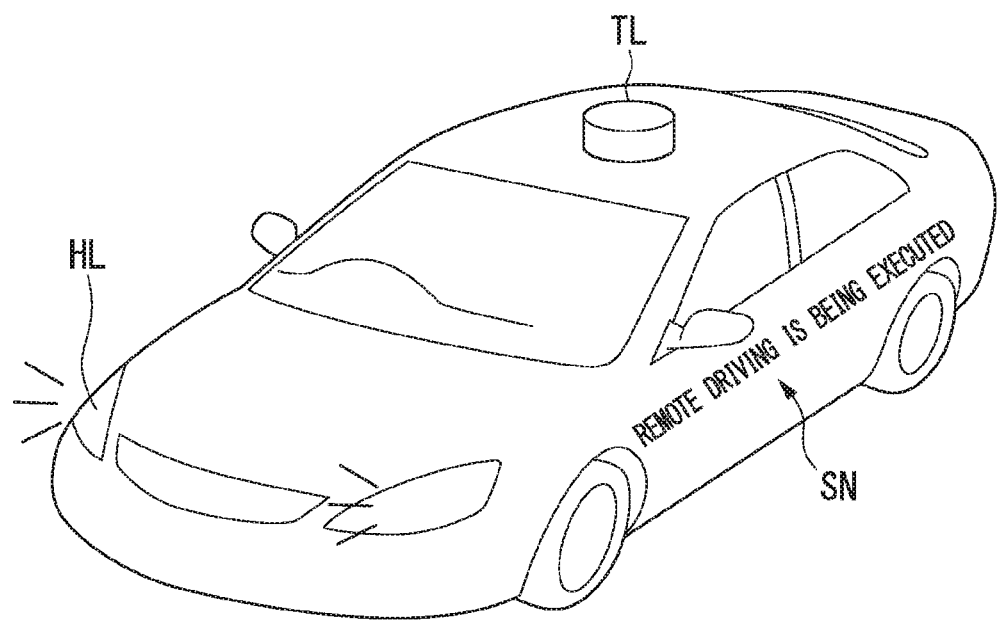
FIG. 8 is a diagram illustrating a state in which information is displayed to the surroundings of the vehicle while the remote driving is being executed.

Further, the remote driving controller 160 may display, to the surroundings of the vehicle, information indicating that the remote driving controller 160 is performing the remote driving or notify the outside of the vehicle of the information while the remote driving controller 160 is performing the remote driving. FIG. 8 is a diagram illustrating a state in which information is displayed to the surroundings of the vehicle while the remote driving is being executed. The display of the information to the surroundings of the vehicle is performed, for example, by displaying that remote driving is being executed, on a signage SN provided in the side of the vehicle body, a window, a hood, a bumper, or the like. The signage SN is formed of an organic EL, a liquid crystal panel, or the like. Further, a light emitter may be rotated in a top lamp TL provided on a roof of the vehicle, or colored light (for example, green) different from a normal color may be radiated in a headlight TL. Further, in addition to (or in place of) the display, the outside of the vehicle may be notified by voice that remote driving is being executed.

[Outside-Vehicle Facility]

Figure 9:
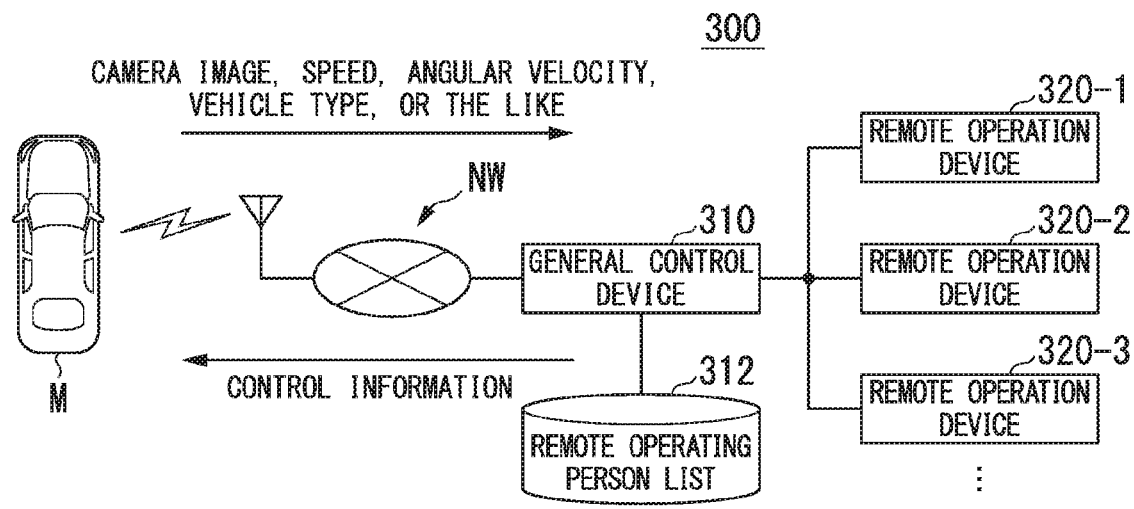
FIG. 9 is a diagram illustrating a device configuration in a remote operation management facility.

Hereinafter, the outside-vehicle facility on the side in which the remote operation is executed will be described. FIG. 9 is a diagram illustrating a device configuration in the remote operation management facility 300. As illustrated in FIG. 9, a general control device 310 that communicates with the vehicle M (a remote operation vehicle) via the network NW, and a plurality of remote operation devices 320-1, 320-2, 320-3, . . . are provided in the remote operation management facility 300. Hereinafter, when the remote operation devices are not distinguished from each other, remote operation devices are simply described as the remote operation device 320. In each of the remote operation devices 320, a remote operating person is seated and stands by in preparation for a remote operation request. The general control device 310 selects one of the remote operation devices 320 in response to a remote operation request from the vehicle M, and transmits information received from the vehicle M (the image captured by the camera 10, the speed, the angular velocity, the vehicle type, or the like, as described above) to the selected remote operation device 320 so that the remote operation is executed.

Figure 10:
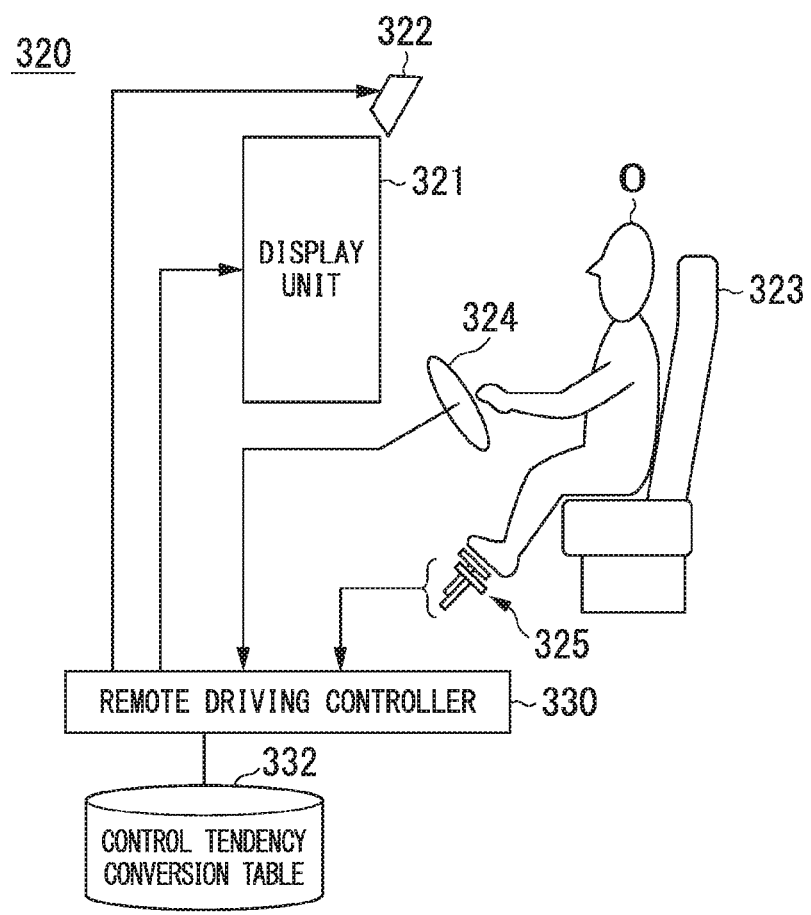
FIG. 10 is a diagram schematically illustrating a configuration of a remote operation device.

FIG. 10 is a diagram schematically illustrating a configuration of the remote operation device 320. The remote operation device 320 includes, for example, a display unit 321, a speaker 322, a seat 323, a steering wheel 324, pedals 325 such as an accelerator pedal and a brake pedal, and a remote operation controller 330.

The display unit 321 displays an image captured by the camera 10 of the vehicle M, a speed of the vehicle M, an engine rotation speed, and the like. It should be noted that the display unit 321 may be a head mount display (HMD). The speaker 322 emits a warning sound in response to approach of an obstacle recognized by the object recognition device 16 of the vehicle M to the vehicle M. A remote operating person O is seated on the seat 323. The remote operating person O performs an operation on a driving operator such as the steering wheel 324 or the pedals 325. The amount of operation on these is detected by a sensor (not illustrated) and output to the remote operation controller 330. The driving operator may be a driving operator of another aspect, such as a joystick. The remote operation controller 330 generates control information to be transmitted to the vehicle M on the basis of the amount of operation input from the driving operator, and transmits the control information to the general control device 310. The general control device 310 transmits the control information generated in this manner to the vehicle M. It should be noted that a reaction force output device for applying reaction force to be generated according to the amount of operation is attached to the driving operator. It is preferable for information such as the speed or the angular velocity to be supplied from the vehicle M to the remote operation device 320 in order to accurately determine the reaction force.

The control information to be transmitted to the vehicle M may be the amount of operation on the steering wheel 324 or the pedals 325 itself, or may be an amount of control to be given to the travel driving force output device 200, the brake device 210, or the steering device 220 (for example, a throttle valve opening degree, a brake torque, an output torque of an assist motor of the steering device 220), which is calculated by adding the above amount of operation to a vehicle speed or a turning angle of the vehicle M at that time.

Here, it is assumed that a degree of response to the above control information differs depending on the vehicle M. On the other hand, it is preferable for a change in behavior of the vehicle M with respect to the amount of operation to be uniform for the remote operating person O who operates the remote operation device 320. Therefore, the remote operation controller 330 refers to the control tendency conversion table 332 and adjusts the control information in order to make the change in behavior with respect to the amount of operation uniform.

Figures 11, 12:
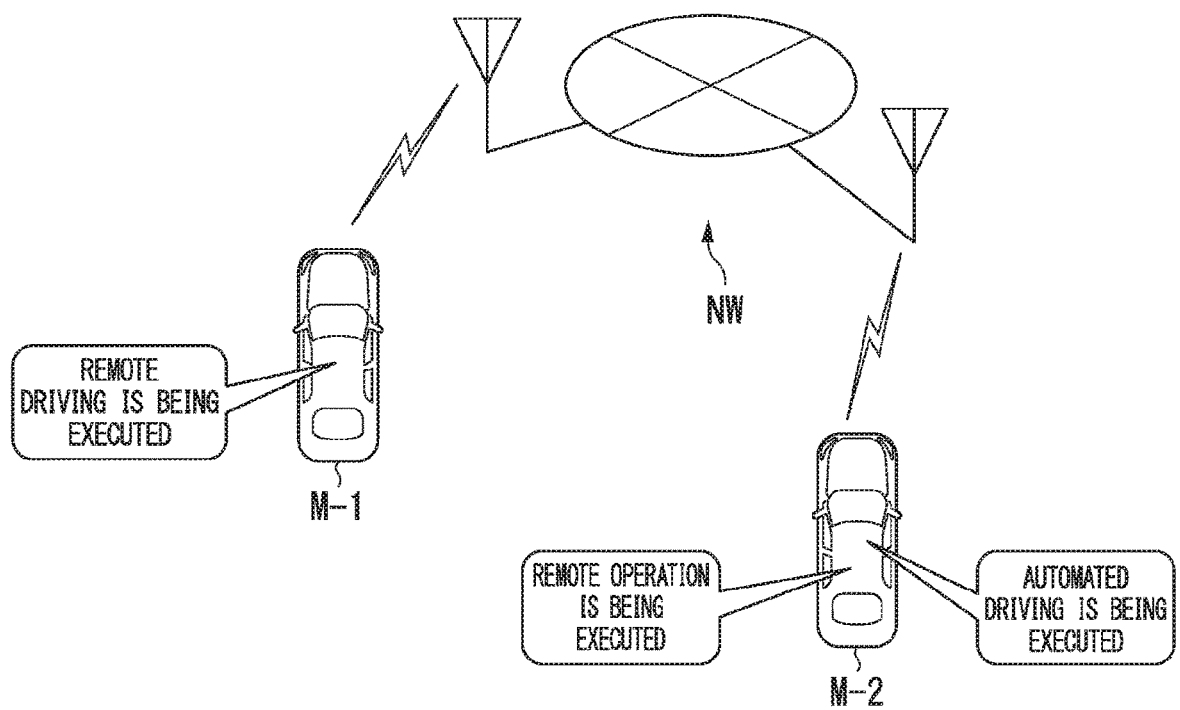
FIG. 11 illustrates an example of content of a control tendency conversion table [[332]].
FIG. 12 is a diagram conceptually illustrating a state in which remote operation is executed by an occupant of the vehicle.

FIG. 11 is a diagram illustrating an example of content of the control tendency conversion table 332. The control tendency conversion table 332 is, for example, information in which how many times the amount of operation is to be used as control information (a magnification) is defined for each vehicle type. For example, when an accelerator operation amount magnification is 1.10, an accelerator operation amount based on an accelerator pedal operation of the remote operation device 320 is multiplied by 1.10 and control information is generated. Thus, it is possible to make a change in behavior of the vehicle with respect to the amount of operation uniform even when vehicle types are different, by referring to the control tendency conversion table 332 for adjusting the control information for each vehicle type.

[Remote Operation from Vehicle]

The remote operation of the vehicle may be performed not by the remote operation device 320 of the remote operation management facility 300 but by an occupant of the vehicle that is being automatically driven. FIG. 12 is a diagram conceptually illustrating a state in which the remote operation is executed by the occupant of the vehicle. In FIG. 12, a vehicle M-1 is a vehicle of which remote driving is being executed as described above. Further, a vehicle M-2 is a vehicle in which driving operators are in a free state since automated driving is executed, and a driving operator inherently used for a driving operation of the vehicle is available as a driving operator for a remote operation. In this case, in the vehicle M-2, for example, an image received from the vehicle M-1 is displayed on a head up display (HUD) or the like, and the remote operation is executed in an environment in which the vehicle M-1 seems to be being driven. It should be noted that, in this case, the remote operation management facility 300 may be interposed between the vehicles M-1 and M-2. That is, the remote operation request may be first transmitted to the remote operation management facility 300 and transferred to the vehicle M that is being automatically driven, by the remote operation management facility 300.

Figure 13:
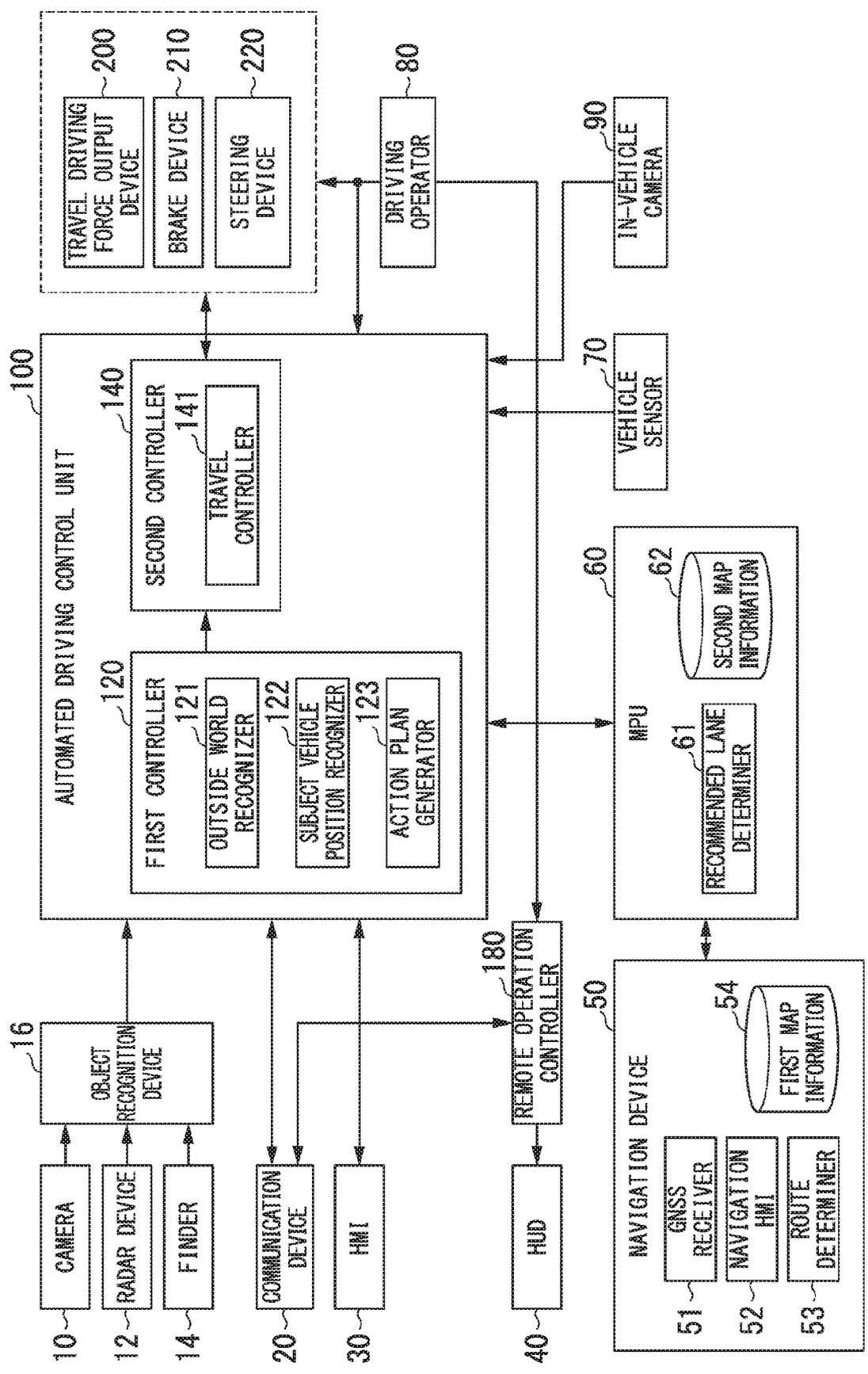
FIG. 13 is a diagram illustrating an example of a configuration mounted in a vehicle M that is remotely operated.

FIG. 13 is a diagram illustrating an example of a configuration that is mounted in a vehicle M that is remotely operated. In FIG. 13, components having the same functions as those described with reference to FIG. 2 are denoted by the same reference numerals. That is, the automated driving control unit 100 mounted in the vehicle M that is remotely operated may have the same function as the automated driving control unit 100 described above.

A HUD 40 and a remote operation controller 180, in addition to the configuration illustrated in FIG. 2, are mounted in the vehicle M that is remotely operated. The remote operation controller 180 causes the HUD to display, for example, an image captured by the camera 10 of the vehicle M that is remotely driven, generates control information to be transmitted to the vehicle M that is remotely driven, on the basis of the amount of operation input from the driving operator 80 that has been in a free state, and transmits the control information to the communication device 20.

It should be noted that, although the vehicle M that is remotely driven and the vehicle M that is remotely operated have been described separately, the vehicle M may be configured as a vehicle having both of these functions. That is, the vehicle M may be a vehicle that can be remotely driven when it is necessary for remote driving to be performed, and remotely operated in response to a request from another vehicle during automated driving.

[Selection of Remote Operating Person]

The remote operating person may be selected on the basis of information from the vehicle M that transmits the remote operation request. In this case, the vehicle M transmits, for example, a reason for activation of the handover event (particularly, a type or degree of cause in a surrounding environment of the vehicle M being an environment in which it would be difficult to continue automated driving) or an index obtained by discretizing this to the remote operation management facility 300. FIG. 14 is a diagram illustrating an example of information that is transmitted from the vehicle M to the remote operation management facility 300. As illustrated in FIG. 14, for example, information such as a vehicle ID that is identification information of a vehicle, a communication ID that is communication identification information, a link ID that is identification information of a link in which the vehicle M is traveling, a progression direction indicating a direction in the link the vehicle is traveling, a reason that is a cause of the remote operation request, and a reason rank in which difficulty of the remote operation for the reason is ranked (discretized) is transmitted from the vehicle M to the remote operation management facility 300. Here, a reason rank A is assumed to be the highest (difficulty of remote operation is high).

The general control device 310 of the remote operation management facility 300 refers to the remote operating person list 312, selects a remote operating person matching the information received from the vehicle M, and causes the remote operation device 320 operated by the selected remote operating person to perform a remote operation. FIG. 15 is a diagram illustrating an example of content of the remote operating person list 312. In the remote operating person list 312, for example, information such as years of remote operation experience, latest evaluation of the remote operation, comprehensive skill for comprehensively evaluating these, and a flag indicating whether or not remote operation is being executed is stored in association with a remote operating person ID that is identification information of the remote operating person.

For example, the general control device 310 selects a remote operating person having a comprehensive skill above the reason rank received from the vehicle M. In the example of FIGS. 14 and 15, since the transmitted reason rank is A for the vehicle M with a vehicle ID of 001, a remote operating person with the comprehensive skill of A and a remote operating person ID of 002 is selected. On the other hand, since the transmitted reason rank is C for the vehicle M with a vehicle ID of 002, a remote operating person with the comprehensive skill of C or higher and a remote operating person ID of 001 or 002 is selected. Through such a process, it is possible to select an appropriate remote operating person according to a degree of difficulty of the remote operation.

Figure 16:
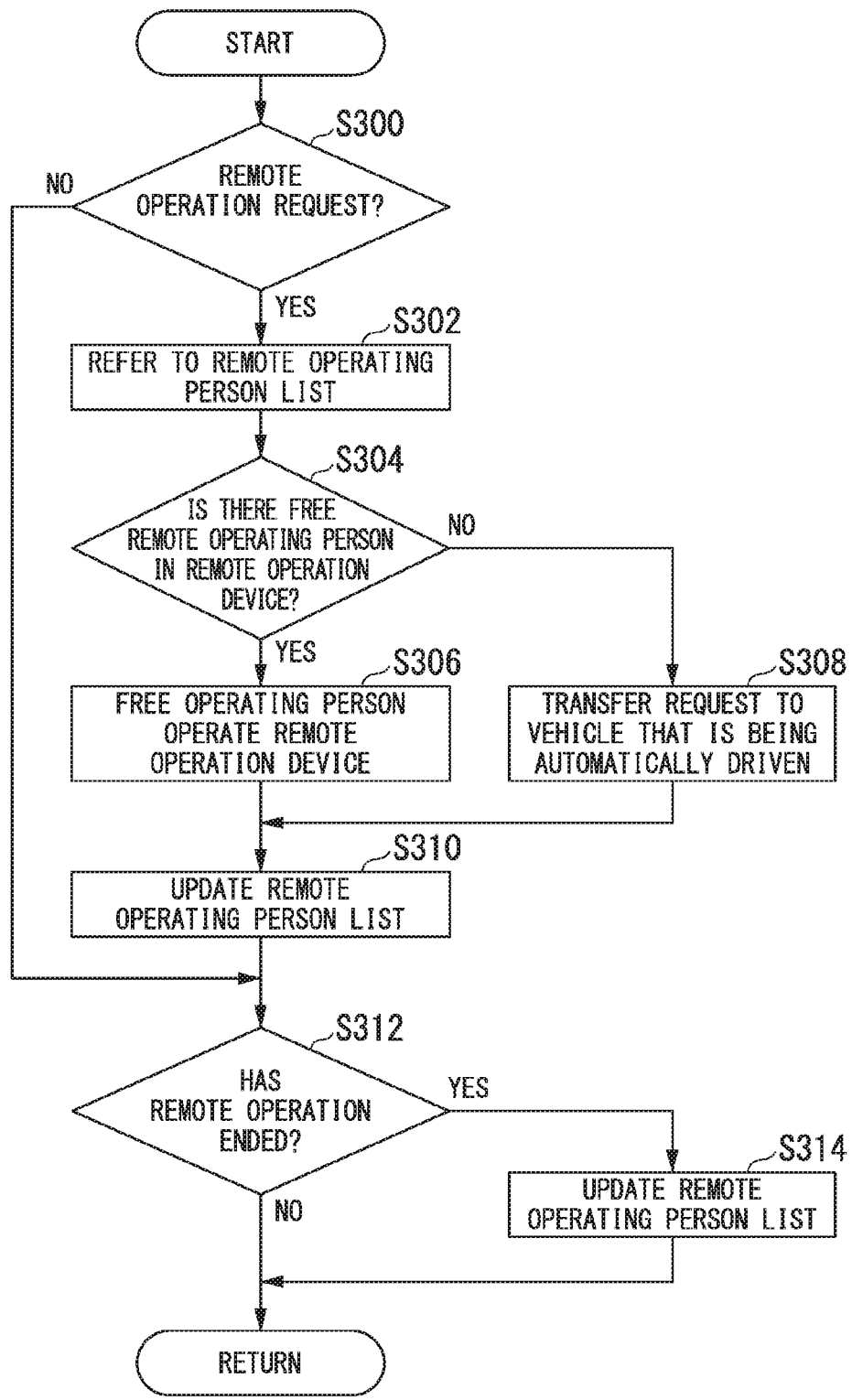
FIG. 16 is a flowchart illustrating an example of a flow of a process that is executed by a general control device.

When the remote operation request is transmitted from the vehicle M to the remote operation management facility 300, the general control device 310 of the remote operation management facility 300 may first confirm whether or not the remote operation is possible in the remote operation device 320, and send a request for the remote operation to the vehicle that is being automatically driven when the remote operation is not possible in the remote operation device 320 (that is, the remote operating person is in a full operation). In this case, information on the vehicle that is being automatically driven and the driver may also be stored in the remote operating person list 312. FIG. 16 is a flowchart illustrating an example of a flow of a process that is executed by the general control device 310. The process of this flowchart is repeatedly performed. First, the general control device 310 determines whether a remote operation request has been received (step S300). When the remote operation request has not been received, the process proceeds to step S312 (to be described below).

When the remote operation request is received, the general control device 310 refers to the remote operating person list 312 (step S302), and determines whether or not there is a free remote operating person seated on the remote operation device 320 (there is a remote operating person who is not executing the remote operation) (step S304).

When there is a free remote operating person, the general control device 310 operates the remote operation device 320 on which the remote operating person (in FIG. 16, a free operator) who is not executing the remote operation has been seated, to cause the remote operation to be performed (step S306). On the other hand, when there is no free remote operating person, the general control device 310 transfers the remote operation request to the vehicle that is being automatically driven and causes the remote operation to be performed (step S308). In this case, communication between the vehicle that is remotely driven and the vehicle that is remotely operated may be performed via the general control device 310 or may not be performed via the general control device 310.

Then, the general control device 310 updates a record regarding the remote operating person who has instructed the remote operation to "execution of remote operation: YES" in the remote operating person list 312 (step S310).

Then, the general control device 310 determines whether or not the remote operation has ended in either of the remote operation device 320 or vehicle (step S312). When the remote operation has ended, the general control device 310 updates the record regarding the remote operating person who has ended the remote operation to "execution of remote operation: NO" in the remote operating person list 312 (step S314).

When the remote operation has ended, evaluation results of the remote operation may be input by the vehicle occupant and transmitted to the general control device 310 in the vehicle that has performed the remote operation. The evaluation results in this case are reflected, for example, in an evaluation item of the remote operating person list 312.

According to the vehicle control device of the first embodiment described above, it is possible to perform the remote driving only in necessary scenes.

Figure 17:
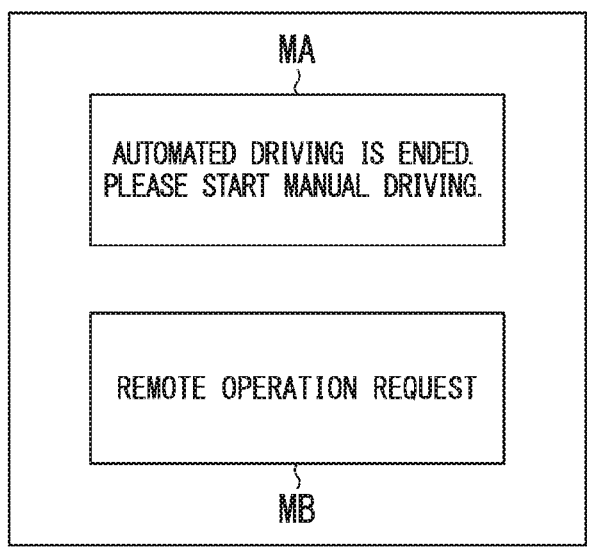
FIG. 17 is a diagram illustrating an example of an input screen for receiving a predetermined operation.

It should be noted that (C) "a predetermined operation has been performed by a vehicle occupant", in addition to (or in place of) the conditions (A) and (B) described above, may be included in the "second condition" that is determined in, for example, the flowchart illustrated in FIG. 5 in the first embodiment. The predetermined operation is performed, for example, on the display device of the HMI 30, which is a touch panel. FIG. 17 is a diagram illustrating an example of an input screen for receiving a predetermined operation. On this input screen, a message area MA for requesting start of manual driving since automated driving has ended is displayed, and a remote operation request MB for requesting remote operation is provided. When the remote operation request MB is operated, the remote operation request is transmitted to the remote operation management facility 300 and the remote driving is started as described above. Accordingly, it is possible to start the remote driving according to an intention of the vehicle occupant.

Second Embodiment

A case in which the remote driving is automatically started when the handover event is activated and the second condition is satisfied has been described in the first embodiment. In a second embodiment, the remote driving is started when permission has been obtained from a vehicle occupant in advance. The permission from the vehicle occupant is input to the HMI 30, for example, at the start of driving.

Figure 18:
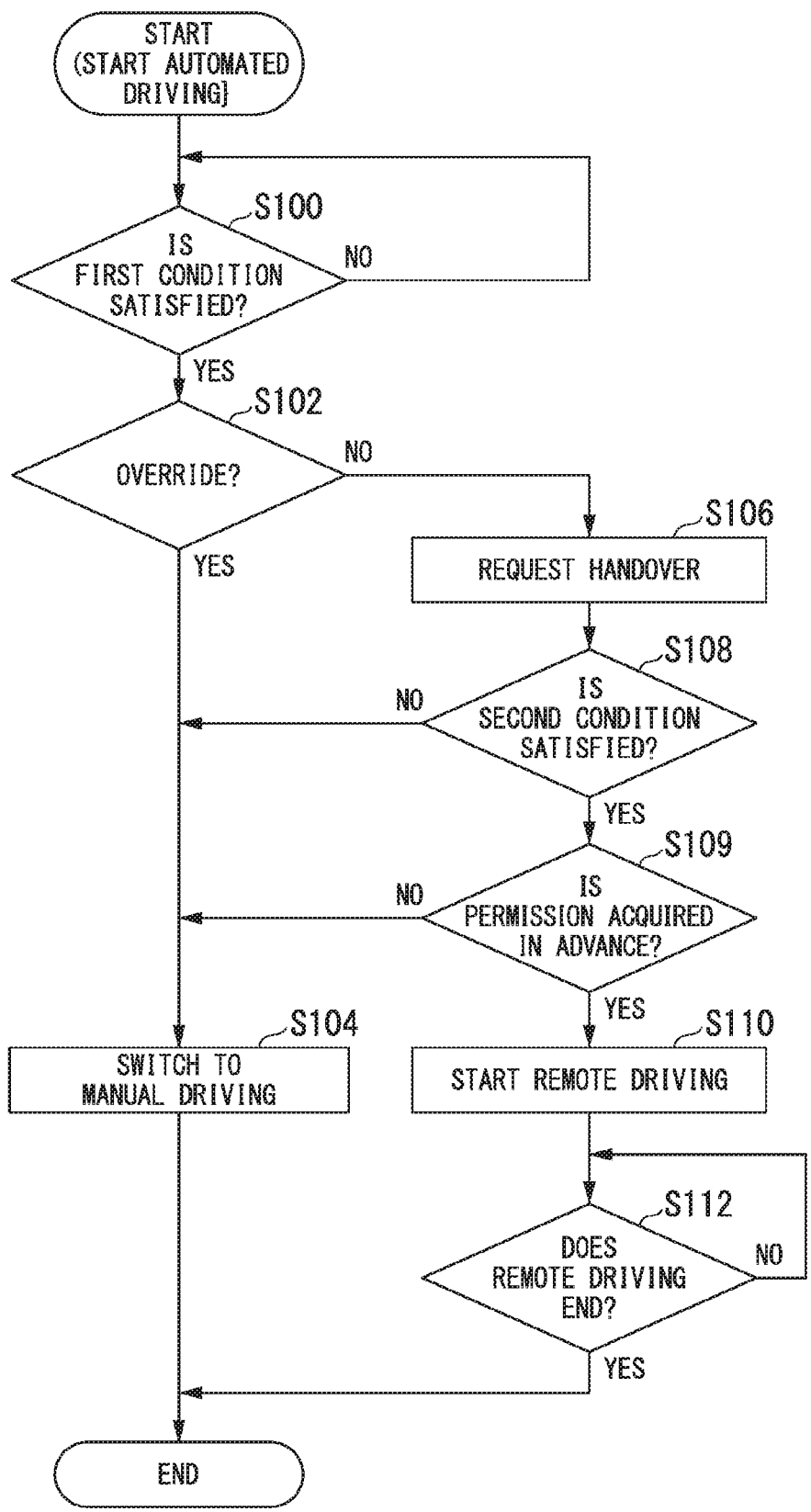
FIG. 18 is a flowchart illustrating an example of a flow of a process that is executed by an automated driving control unit according to a second embodiment.

FIG. 18 is a flowchart illustrating an example of a flow of a process that is executed by the automated driving control unit 100 of the second embodiment. Since processes other than step S109 in the flowchart are the same as the processes illustrated in the flowchart of FIG. 5, description thereof will be omitted. In the flowchart of FIG. 17, when the second condition is satisfied, the remote driving controller 160 determines whether or not permission of the remote driving is obtained in advance (step S109). When the permission of the remote driving is not obtained in advance, switching to the manual driving is performed (step S104), and when the permission of the remote driving is obtained in advance, the remote driving is started (step S110).

It should be noted that, in the second embodiment, it may be included in the second condition that the permission of the remote driving is obtained in advance. Further, when the permission of the remote driving is obtained in advance, the handover request may be omitted, and when the first condition is satisfied (but not overriding), the remote driving may be immediately started.

According to the second embodiment described above, it is possible to perform control further reflecting intention of a vehicle occupant, in addition to achieving the same effects as in the first embodiment.

Third Embodiment

Figure 19:
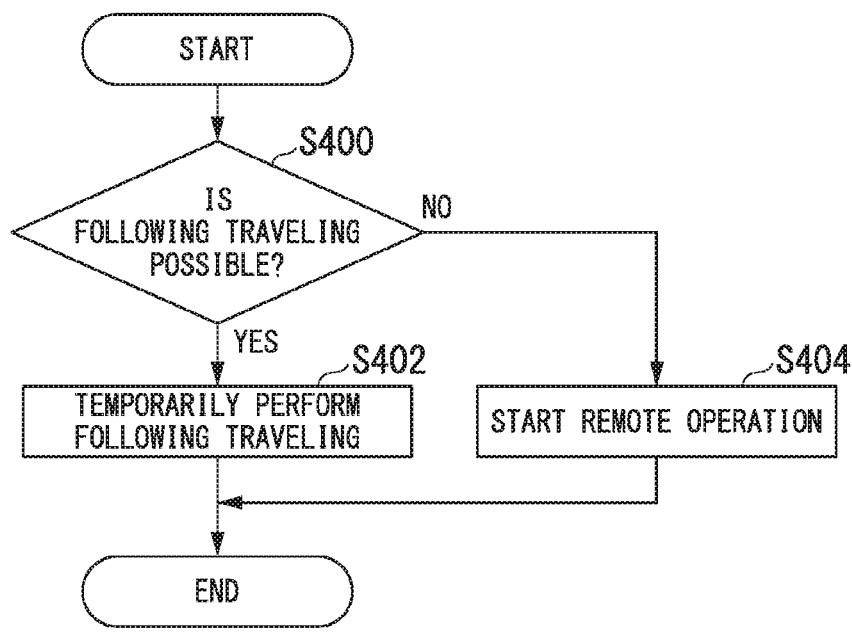
FIG. 19 is a flowchart illustrating an example of a flow of a process that is executed by an automated driving control unit of a third embodiment.

In a third embodiment, when the first condition and the second condition are satisfied, not only the remote operation but also temporarily traveling while following a preceding vehicle are set as control options. FIG. 19 is a flowchart illustrating an example of a flow of a process that is executed by the automated driving control unit 100 of the third embodiment. The process of this flowchart is executed in place of the "start of the remote operation" in step S110 of the flowchart of FIG. 5 or step S204 of the flowchart of FIG. 6.

First, the automated driving control unit 100 determines whether or not following traveling is possible (step S400). For example, when there is a preceding vehicle within a predetermined distance, it is determined that the following traveling is possible. When the following traveling is possible, the automated driving control unit 100 temporarily performs the following traveling (step S402). "Temporarily" means, for example, a period of time until a vehicle occupant is awakened when the vehicle occupant is in a sleep state, or a period of time until a vehicle passes through a place that is in a congested state when a place in the front of the vehicle is in a congested state. On the other hand, when the following traveling is not possible, the remote driving controller 160 of the automated driving control unit 100 starts the remote driving as in the first or second embodiment (step S404).

According to the third embodiment described above, it is possible to reduce a load of control or communication by temporarily performing following traveling in a scene in which the remote driving is unnecessary, in addition to achieving the same effects as in the first embodiment.

Although each of the embodiments described above is on the premise that a subject performing the remote operation is a person, the subject performing the remote operation may be a virtual machine in which the latest automated driving software has been installed.

REFERENCE SIGNS LIST

1 Vehicle control system
10 Cameras
16 Object recognition device
20 Communication device
30 HMI
80 Driving operator
90 In-vehicle camera
100 Automated driving control unit
120 First controller
140 Second controller
160 Remote driving controller
162 Occupant state detector
300 Remote operation management facility
310 General control unit
312 Remote operating person list
320 Remote control device
332 Control tendency conversion table

What is claim is:

1. A vehicle control device comprising:
an acquisitor that acquires a situation outside a vehicle;
a driving operator on which an operation for manual driving is performed by a vehicle occupant;
an automated driving control unit that executes automated driving for automatically controlling at least one of acceleration/deceleration and steering of the vehicle on the basis of the situation outside the vehicle acquired by the acquisitor, and ends the automated driving and performs switching to the manual driving when a first condition is satisfied;
a communicator that communicates with an outside-vehicle facility;
a remote driving controller that sends a request for a remote operation to the outside-vehicle facility using the communicator when a second condition is satisfied in a case in which the automated driving control unit performs switching from the automated driving to the manual driving, and executes remote driving for automatically controlling the at least one of acceleration/deceleration and steering of the vehicle on the basis of control information received from the outside-vehicle facility; and
an output unit that outputs information,
wherein the automated driving control unit causes the output unit to output information for requesting an operation of the driving operator when ending the automated driving and performing switching to the manual driving, ends the automated driving, and performs the switching to the manual driving when an operation of a predetermined amount or more on the driving operator is performed, and
the second condition includes that the vehicle occupant does not operate the driving operator by a predetermined amount or more after the automated driving control unit notifies the vehicle occupant of the switching to the manual driving.

2. The vehicle control device according to claim 1, further comprising:
a detector that detects a state of the vehicle occupant,
wherein the second condition includes that the state of the vehicle occupant detected by the detector is not suitable for performing the manual driving.

3. The vehicle control device according to claim 1, further comprising:
an input unit that receives an input operation of the vehicle occupant,
wherein the second condition includes that a predetermined operation has been performed on the input unit.

4. The vehicle control device according to claim 1,
wherein the acquisitor includes a camera that images the vicinity of the vehicle, and
the remote driving controller transmits an image captured by the camera to the outside-vehicle facility using the communicator.

5. The vehicle control device according to claim 1,
wherein the first condition is that execution of the automated driving has become difficult, and the remote driving controller transmits information based on a type or degree of cause of difficulty in executing the automated driving to the outside-vehicle facility using the communicator.

6. The vehicle control device according to claim 1, wherein the automated driving control unit is capable of executing following traveling in which the vehicle travels while following another vehicle during execution of the automated driving, and switching between whether the automated driving control unit executes following traveling and the remote driving controller executes the remote driving is performed on the basis of a situation in which the first condition is satisfied.

7. The vehicle control device according to claim 1, further comprising:
a display unit that displays information inside or outside the vehicle,
wherein the remote driving controller causes the display unit to display information indicating that the remote driving is being executed when the remote driving is executed.

8. The vehicle control device according to claim 1, further comprising:
an input unit that receives an input operation of the vehicle occupant,
wherein the remote driving controller starts the remote driving when an input operation indicating permission of the remote driving performed on the input unit is performed in advance.

9. The vehicle control device according to claim 1, further comprising:
an input unit that receives an input operation of the vehicle occupant,
wherein the remote driving controller transmits evaluation results of the remote operation input to the input unit to the outside-vehicle facility after performing the remote driving.

10. A vehicle control system comprising:
a vehicle control device according to claim 1; and
the outside-vehicle facility.

11. The vehicle control system according to claim 10, wherein the first condition is that execution of the automated driving has become difficult, and
the remote driving controller transmits information based on a type or degree of cause of difficulty in executing the automated driving to the outside-vehicle facility using the communicator, and
the outside-vehicle facility includes
a plurality of remote operation devices that are each operated by a remote operating person; and
a general control device that selects a remote operating person who is to perform remote operation on the basis of information received from the remote driving controller.

12. The vehicle control system according to claim 10, wherein the outside-vehicle facility includes conversion information for defining an amount of conversion when generating the control information with respect to an amount of operation of a remote operating person for each vehicle type, and converts the amount of operation of the remote operating person with the conversion information to generate the control information.

13. A vehicle control method using a computer comprising: acquiring a situation outside a vehicle; executing automated driving for automatically controlling at least one of acceleration/deceleration and steering of the vehicle on the basis of the acquired situation outside the vehicle, and ending the automated driving and performing switching to manual driving when a first condition is satisfied; communicating with an outside-vehicle facility; sending a request for a remote operation to the outside-vehicle facility when a second condition is satisfied in a case in which switching from the automated driving to the manual driving is performed, and executing remote driving for automatically controlling the at least one of acceleration/deceleration and steering of the vehicle on the basis of control information received from the outside-vehicle facility; and outputting, by the computer, information using an output unit, wherein the execution of the automated driving includes causes the output unit to output information for requesting an operation of a driving operator on which an operation for the manual driving is performed by a vehicle occupant when ending the automated driving and performing switching to the manual driving, ending the automated driving, and performing the switching to the manual driving when an operation of a predetermined amount or more on the driving operator is performed, and the second condition includes that the vehicle occupant does not operate the driving operator by a predetermined amount or more after the notification to the vehicle occupant of the switching to the manual driving.

14. A computer-readable non-transitory storage medium storing a vehicle control program causing a computer to:
acquire a situation outside a vehicle;
execute automated driving for automatically controlling at least one of acceleration/deceleration and steering of the vehicle on the basis of the acquired situation outside the vehicle, and end the automated driving and perform switching to manual driving when a first condition is satisfied;
communicate with an outside-vehicle facility; and
send a request for a remote operation to the outside-vehicle facility using the communicator when a second condition is satisfied in a case in which switching from the automated driving to the manual driving is performed, and execute remote driving for automatically controlling the at least one of acceleration/deceleration and steering of the vehicle on the basis of control information received from the outside-vehicle facility; and
outputting information using an output unit,
wherein the execution of the automated driving includes causing the output unit to output information for requesting an operation of a driving operator on which an operation for the manual driving is performed by a vehicle occupant when ending the automated driving and performing switching to the manual driving, ending the automated driving and performing the switching to the manual driving when an operation of a predetermined amount or more on the driving operator is performed, and
the second condition includes that the vehicle occupant does not operate the driving operator by a predetermined amount or more after the notification to the vehicle occupant of the switching to the manual driving.

* * * * *